United States Patent [19]

Ohishi et al.

[11] Patent Number: 5,309,452
[45] Date of Patent: May 3, 1994

[54] PRASEODYMIUM LASER SYSTEM

[75] Inventors: Yasutake Ohishi, Mito, Japan; Elias Snitzer, Piscataway, N.J.

[73] Assignee: Rutgers University, New Brunswick, N.J.

[21] Appl. No.: 830,430

[22] Filed: Jan. 31, 1992

[51] Int. Cl.$^5$ .................................................. H01S 3/30
[52] U.S. Cl. .................................................. 372/6; 385/142
[58] Field of Search .............................. 385/142; 372/6

[56] References Cited

U.S. PATENT DOCUMENTS

| | | | |
|---|---|---|---|
| 3,599,114 | 8/1971 | Snitzer | 372/40 |
| 3,700,423 | 10/1972 | Kantorski | 372/40 |
| 4,726,652 | 2/1988 | Tajima et al. | 385/142 |
| 4,761,387 | 8/1988 | Tokida | 350/96.340 |
| 4,820,445 | 4/1989 | Piekarczyk | 252/301.40 R |
| 4,842,366 | 6/1989 | Sawada | 350/96.30 |
| 4,967,416 | 10/1990 | Esterowitz | 392/6 |

FOREIGN PATENT DOCUMENTS 9005524  5/1990  France .

OTHER PUBLICATIONS

M. J. Weber, "CRC Handbook of Laser Science and Technology", CRC Press, Boston, MA., Supplement 1: Lasers 1991.
A. A. Kaminskii, Kurbanov, et al., "New Channels for Stimulated Emission of Pr$^{3+}$ IONS in Tetragonal Fluorides LiRF", vol. 23, No. 11, pp. 1934–1935, Nov. 1987, Original: Jan. 7, 1986.
N. Spector, "Spectroscopy of Praseodymium (111) in Zirconium Fluoride Glass", vol. 117, No. 2, pp. 108–114, Jun. 7, 1985.
Kaminskii, Kurbanov & Uvarova, "Stimulated Radiation from Single Crystals", 1987 Plenum Publishing Corporation.
Electronics Letters "Tunable CW Lasing Around 610, 635, 695, 715, 885 and 910 nm In Praseodymium-doped Fluorozirconate Fiber", by J. Y. Allain, M. Monerie, H. Poignant; vol. 27, No. 2, Jan. 17, 1991.

*Primary Examiner*—Georgia Y. Epps
*Attorney, Agent, or Firm*—Peter K. Trzyna; Richard A. Speer

[57] ABSTRACT

A system for producing an optical gain. The system includes an optical fiber having a core and a cladding, the core being doped with Pr$^{3+}$; and a source producing light to energize the Pr$^{3+}$ to the $^1G_4$ state and produce an optical gain by a $^1G_4$-$^3H_5$ transition at a wavelength in the range of 1.25 to 1.34 microns. The system also includes a method of making and a method of using the same.

81 Claims, 6 Drawing Sheets

PRASEODYMIUM LASER SYSTEM

I. BACKGROUND OF THE INVENTION

A. Field of Invention

The present invention relates to a laser system having an optical fiber doped with Praseodymium ($Pr^{3+}$). The laser system energizes the $Pr^{3+}$ to produce a optical gain by the $^1G$ -$^3H_5$ transition at a wavelength in the range of about 1.25 to 1.34 microns. The optical fiber can be glass, crystalline, or a combination thereof, and made out of a halide or chalcogenide host or combinations thereof. The optical fiber can be energized by direct pumping of the $Pr^{3+}$ or by indirect pumping, by using rare earths and other sensitizers as co-dopants located in a region of the optical fiber so that they can absorb pump energy and transfer excitation to the $Pr^{3+}$. The optical fiber can be incorporated into an amplifier, an oscillator, or a superluminescence source. The output can be applied to communications, a gyroscope or other sensors, printing, and medical instruments.

B. Description of the Related Art

There is a need to amplify optical signals in many fields of technology. In fiber optic communications, for example, to send cable television signals to many households over optical fibers, it is necessary to split the signals into many receivers. Without amplification, one would in all practicality eventually run out of signal to divide. It is through amplification (increasing the strength of the signal) that such signals can be provided to many households. One way to amplify the light signals is to convert them to electrical signals, amplify the electrical signals, and then reconvert the electrical signals back to light again. This is a relatively complicated and expensive approach, but it is necessary where there is no known, practical device that can optically amplify the relevant region of the light spectrum.

For example, prior to this invention, it has been essentially necessary to use electrical rather than optical amplification for one of the primary wavelengths used in communications (1.25–1.34 microns). Further, in the search to find a way to optically amplify this wavelength region, despite great efforts, solutions have been elusive. Thus, when aspects of the present invention were made public, the *Wall Street Journal* reported them as a "breakthrough in optical signal amplification" (on Jun. 12, 1991, in an article titled "Big Cost Savings for Fiber-Optic Systems are seen in New Way to Amplify Signals").

II. SUMMARY OF THE INVENTION

It is an object of the present invention to provide an optical fiber doped with $Pr^{3+}$ in an amount sufficient to produce a gain by the $^1G_4$-$^3H_5$ transition.

It is a further object of the present invention to provide a system for producing a gain for a wavelength in the range of about 1.25 to 1.34 microns.

It is a further object of the present invention to provide methods of making the optical fiber.

It is another object of the present invention to provide methods of making the optical fiber using hosts that are glass, crystalline, or a combination thereof.

It is another object of the present invention to provide methods of making the optical fiber using a fluoride or other halide host, or using a chalcogenide host, or a chalco-halide host.

It is another object of the present invention to improve the optical fiber with at least one co-doped sensitizer.

It is another object of the present invention to provide optical pump sources suitable for pumping the $Pr^{3+}$ in the optical fiber.

It is another object of the present invention to provide methods for using the optical fiber in an oscillator and in an amplifier.

These and other objects that will be apparent from the following disclosure are accomplished by energizing an optical fiber doped with $Pr^{3+}$ to produce ions energized to the $^1G_4$ state and an optical gain from the $^1G$ -$^3H_5$ transition to output light at a wavelength in the range of about 1.25 to 1.34 microns. The optical fiber can include a fluoride or other halide host, or can be made of another material that does not excessively quench the gain, such as hosts with extended infrared transparency. The optical fiber can be glass, crystalline, or a combination thereof. The optical fiber can have one or more sensitizers co-doped with the $Pr^{3+}$, such as rare earth ions, including erbium ($Er^{3+}$), ytterbium ($Yb^{3+}$), and neodymium ($Nd^{3+}$). The optical fiber can also be co-doped with one or more additional sensitizers such as transition ions e.g., chromium ($Cr^{3+}$), or combinations of these ions which with the aforementioned ions sensitize the $Pr^{3+}$ fluorescence. Alternatively, the sensitizers can be used in multi-core and multi-clad fiber configurations. The optical fiber can be incorporated into an amplifier or an oscillator to provide light for communications, a gyroscope or other sensors, printing, and medical applications.

IV. DETAILED DESCRIPTION OF THE INVENTION

Figure 1:
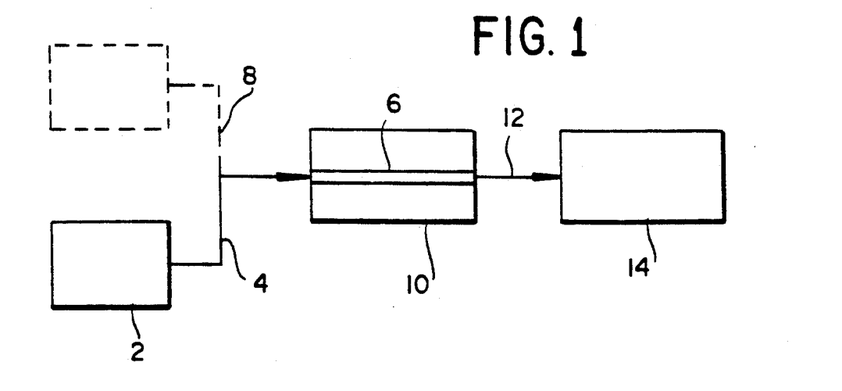
FIG. 1 is a diagram of a laser system embodying an optical fiber of the present invention.

FIG. 1 illustrates the basic elements of a laser system according to the present invention. There is a light source 2, also known as a "pump," which outputs light 4 to an optical fiber 6 containing $Pr^{3+}$. In some applications, a light signal 8, such as a communications signal or a continuous signal, is also directed to the optical fiber 6. The optical fiber 6 can be incorporated into a laser device 10, such as an amplifier or an oscillator. The light 4 energizes the $Pr^{3+}$ optical fiber 6 at about room temperature to produce light 12 having a gain by the $^1G_4$-$^3H_5$ transition at a wavelength in the range of 1.25–1.34 microns, which boosts the strength of input signal 8 within light 12. In the embodiment shown in FIG. 1, light 12 is used in an application 14, such as a communications system.

A. Optical Fiber 6

1. Forming a Structure for Use as the Optical Fiber

Figure 2:
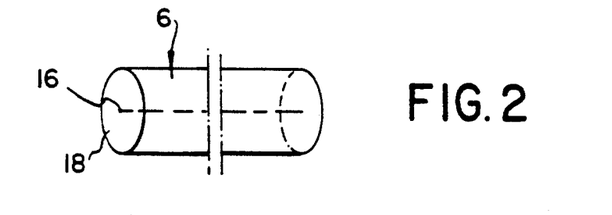
FIG. 2 is a diagram of one way to structure the optical fiber of the present invention to have a core and a cladding.

Optical fiber 6 is illustrated in FIG. 2 as a cylindrical optical fiber having a core 16 inside a cladding 18. The core 16 has an index of refraction ($n_1$), and the cladding 18 has a lower index of refraction ($n_2$). From these two indexes of refraction, a quantity called the numerical aperture NA can be defined as follows:

$$NA = (n_1^2 - n_2^2)^{\frac{1}{2}}$$

The value for NA, the diameter of the core 16, and the wavelength of operation are also related by a formula that yields the conditions under which there would be single-mode propagation of the laser light in the core of the fiber. The pattern on the end of the fiber core appears as only one spot of light under any conditions of illumination for single-mode propagation. A "V" value is equal to the quantity $\pi$ (3.1416 . . . ) times the diameter of the core (d) divided by the wavelength of propagation $\lambda$ and then multiplied by the NA, i.e., $$V = \frac{\pi d}{\lambda} NA$$

For indices of refraction for the core and cladding of $n_1$ and $n_2$, the condition for single-mode laser operation requires that the value for V be less than the number 2.405. Preferably, however, single mode fibers should have V values in the range of 1.0 to 2.4, with perhaps the middle of that range, about 1.5 to 2.3, being the most likely values to be used.

The NA should preferably be about in the range of 0.12 to 0.17, but it can range about from 0.02 to 1.0. But a common and desirable range is from 0.12 to 0.3. A large NA requires that the value for ($n_1$-$n_2$), be large, which in turn requires a large compositional change for the core versus the cladding, which, if too severe, could present glass compatibility problems in fabrication.

An optical fiber having the above-described relationships can be fabricated in a variety of ways. One representative method involves a "rod-in-tube" method in which the rod becomes the core 16 and the tube becomes the cladding 18. A tube can be fabricated, for example, by forming a rod, drilling a hole in the center of the rod to form a tube, and then polishing the interior surface of the tube. Another approach is to spin cast the glass into a tube form. In either case, the tube must have a hole slightly larger than the diameter of the rod to be used for the core 16.

To make the fiber 6, the rod is inserted in the tube, and the combination is heated to the point where they soften and the rod and tube join. The combination then is drawn into a fiber having the aforementioned structural parameters.

Other fabrication methods exist that ar suitable for making fibers formulated according to the present invention. One technique involves the use of a multiple wall crucible. Molten core glass is in at least one inner compartment of the crucible, and the molten cladding glass is in an outer region of the crucible. The fiber is drawn directly from an opening in the bottom of the two compartments.

Alternatively, a double clad configuration can be fabricated. The $Pr^{3+}$ is located in a single mode core surrounded by a first cladding of approximately rectangular cross section (which can be made by grinding two flat surfaces on a circular cross-section preform), which in turn is surrounded by a second cladding of still lower refractive index. The latter can comprise a fluorinated acrylate (plastic), with an index of refraction of, for example, 1.39.

A typical value for the index of refraction of the core would be about 1.5. The first cladding would have a lower index of refraction of about 1.49. The dimensions of the first cladding can be approximately 40 microns by about 120 microns.

For additional information concerning methods that can be used to make a fiber suitable for incorporating the $Pr^{3+}$ and the sensitizers according to the present invention, see, for example, Danh C. Tran, George H. Sigel, Jr., and Bernard Bendow, "Heavy Metal Fluoride Glasses and Fibers: A Review," *Journal of Lightwave Technology*, Vol. LT-2, No. 5, October 1984, pp. 566-586; Y. Ohishi, et al., "Fabrication of Fluoride Glass Single-Mode Fibers," *Journal of Lightwave Technology*, Vol. LT2, No. 5, Oct. 1984; "Advanced Rod in Tube Techniques for Fluoride Fiber Fabrication," presented at the 93rd Annual Meeting of the American Ceramic Society, a symposium on optical materials, held in Cincinnati, Ohio (Apr. 28–May 2, 1991); Tran, et al., "Fluoride Glass Preforms Prepared by a Rotational Casting Process," *Electronics Letters*, 23nd Vol. 18, No. 15, July 1982; and S. Mitachi, et al., "Preparation of Fluoride Optical Fibers for Transmission in the Mid-infrared," *Physics and Chemistry of Glasses*, Vol. 23, No. 6, December 1982, all incorporated by reference herein.

As part of the aforementioned fabrication processes, according to the present invention, the core 16 is doped with $Pr^{3+}$, the particular ion for lasing. (The term "dope" means to use a small concentration of an added material. A small concentration implies that the added material does not significantly affect the properties of the host glass, such as viscosity and other intrinsic properties of the glass.) The dopant is added to a batch of the glass from which the core 16 is made. In addition, other active dopants (herein mentioned as sensitizers) can be added to the core as discussed subsequently herein.

Other non-lased dopants can also be added or substituted to tailor the fiber to specific needs. For example, indices of refraction can be made to increase or decrease by the additions of small amounts of different constituents. In a ZBLAN host, the addition of a small amount of lead, for example, increases the index of refraction, and substituting hafnium for zirconium decreases the index of refraction. By adding such known constituents, one can readily tailor the optical fiber properties of the fiber to the specific needs of a given application, for example, to obtain desired values for $n_1$ and $n_2$, the indices of refraction of core and cladding.

1. Proportions of $Pr^{3+}$ a. Energy Levels

Figure 3:
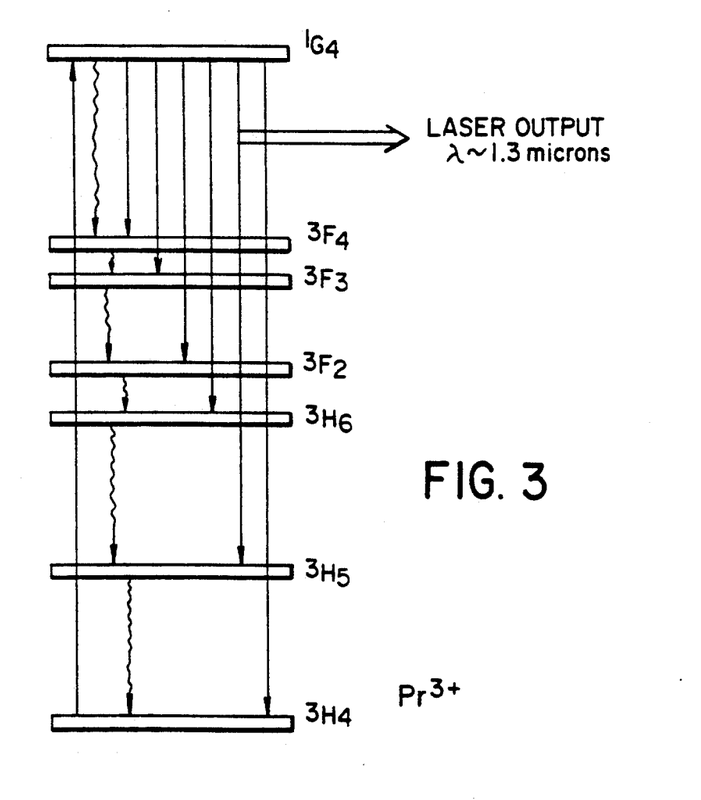
FIG. 3 is an energy level diagram for $Pr^{3+}$ for the present invention.

A material that is capable of lasing in a transition between two energy levels shows fluorescence at the wavelength corresponding to that transition between the atomic energy levels or states. Atomic energy levels are the specific energy levels that electrons can occupy for a specific element if given a sufficient amount of energy, and FIG. 3 is a diagram of some of the energy levels for $Pr^{3+}$.

By absorption of appropriate wavelength(s) of light, or by energy transfer from other energized ions, the $Pr^{3+}$ can have more ions in an upper energy level than in a lower level. This condition is generally referred to as an "inversion" between those two levels. If an inversion occurs, and if light is incident on the material to cause an induced emission from the upper to the lower states, as electrons revert to the lower level, they give off energy that produces a "gain" (i.e., an amplification) for light at the wavelength corresponding to the energy separation between the levels.

At normal room temperature operation, the $^3H_5$ state is unoccupied. The lowest energy level $^3H_4$ is the ground state and it is the state from which the material is excited to the $^1G_4$ state. The $Pr^{3+}$ electrons are energized to occupy the $^1G_4$ level by illuminating them with light having a wavelength in the range of 0.94 to 1.07 microns. When the $Pr^{3+}$ electrons give up their energy and make a transition from the $^1G_4$ level to the $^3H_5$ level, light having a wavelength of about 1.3 microns is produced.

Note that there are other radiative transitions from the $^1G_4$ level to all of the lower levels of $^3F_4$, $^3F_3$, $^3F_2$, $^3H_6$, $^3H_5$, and the ground state $^3H_4$. These are indicated by the straight arrows in FIG. 3. The relative transition probability to go from the $^1G_4$ to any of these other levels is known as the "branching ratio." For example, the branching ratio to go to the $^3H_5$ from the $^1G_4$, which is the desired transition to produce a wavelength of 1.3 microns, is about 64% for $Pr^{3+}$ in ZBLAN. A branching ratio of 64% is a particularly high value. This means that 64% of the fluorescence from the $^1G_4$ level is in the desired transition at 1.3 microns. There can, in addition, be non-radiative quenching by various mechanisms in which the $Pr^{3+}$ goes from one level to a lower level, with the energy difference given up as heat. These non-radiative transitions in FIG. 3 are shown as wavy arrows.

b. Absorption

In determining a composition suitable for producing a net gain, one consideration is "excited state absorption," i.e., the absorption of the energy by an electron going to an even higher energy level. The gain from the downward transition must be greater than the absorption in order to have a total net gain. There is an excited state absorption from the $^1G_4$ level to the $^1D_2$ level (not shown in FIG. 3) which decreases the gain on the long wavelength side of the fluorescence (primarily for $\lambda$ greater than about 1.31 microns) but does not adversely affect to any extent the short wavelength portion of the fluorescence or gain due to induced emission.

c. Concentration Quenching

If the concentration of the $Pr^{3+}$ in the core 18 of optical fiber 6 is too high, there can be an interaction between an excited $Pr^{3+}$ ion in the $^1G_4$ state and another ion in the ground state. This leads to non-radiative transitions of both ions to intermediate states, from which there are other non-radiative transitions down to the ground state. This phenomena, known as "concentration quenching" quenches the excitation of the ions in the $^1G_4$ state.

Figure 4:
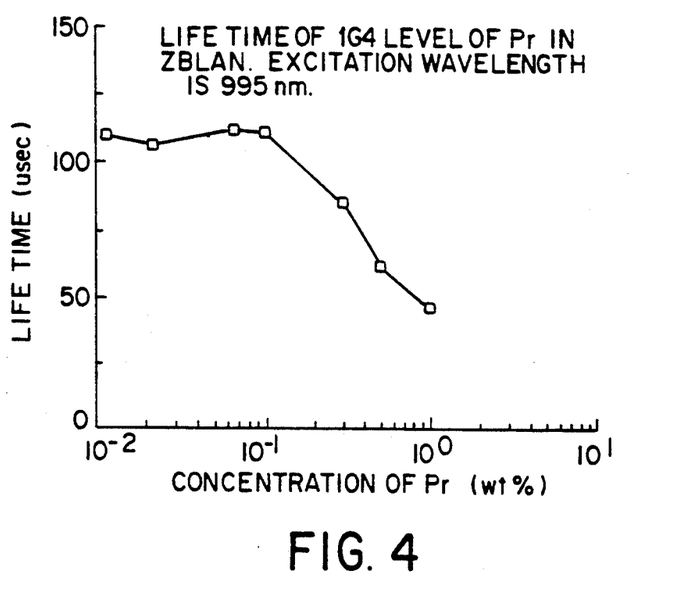
FIG. 4 is a graph showing the lifetime of fluorescence from the $^1G_4$ energy level of $Pr^{3+}$ in ZBLAN versus the concentration of the $Pr^{3+}$ in weight percent.

Empirical testing can be used to determine the proper amount of dopant(s) for the host. This testing involves determining the degree of quenching that occurs. One method is by measuring the lifetime of fluorescence as a function of concentration. For example, the testing involves constructing a relationship of concentration of the $Pr^{3+}$ and the lifetime of fluorescence after pumping the $Pr^{3+}$ to the excited $^1G_4$ state, as illustrated in FIG. 4. FIG. 4 shows the lifetimes of fluorescence from the $^1G_4$ energy level of $Pr^{3+}$ in a ZBLAN glass host for an excitation wavelength of 995 nanometers.

Note in FIG. 4 that the lifetime is 50 microseconds for a concentration of 1% by weight of $Pr^{3+}$ ions, and that a lifetime of about 110 microseconds results from a concentration of 0.1%. If there is a further decrease in concentration of $Pr^{3+}$, there is no significant change in the fluorescent lifetime. Thus, for this particular host material (ZBLAN) and dopant ($Pr^{3+}$), it is preferable to have no more than about 0.1% of the $Pr^{3+}$ (that is, a thousand parts per million by weight of the $Pr^{3+}$ ion).

d. Phonon Quenching

In addition to the concentration quenching, there can be quenching associated with the phonon spectrum of the host material. This kind of quenching is due to the oscillatory movements of the host ions near the $Pr^{3+}$ ion. Thus, if an improved host material is doped with $Pr^{3+}$ to show less phonon quenching, it may be preferable to decrease the concentration of the $Pr^{3+}$ so that concentration quenching of the $Pr^{3+}$ is not the limit to efficient fluorescence and laser action.

For example, in the ZBLAN glass host portrayed in FIG. 4, the upper limit for concentration of $Pr^{3+}$ is about 0.1 weight percent, and for this concentration and concentrations lower than this value, the fluorescent lifetime is about 110 microseconds. This value of 110 microseconds is one which results not only from the radiative emission rate, but also from the quenching or non-radiative transition probability associated with the host. If an improved host material is found which reduces the phonon quenching, more efficient fluorescence would be obtained with a concentration that is still lower than a tenth weight percent of the $Pr^{3+}$.

2. Host Compositions a. Glass

The non-radiative relaxation rate from one energy level of a rare earth ion to the next lower energy level which is below it by an amount $\Delta E$ depends on the highest energy phonon in the phonon spectrum of the host glass. (A phonon refers to the energy associated with a vibration pattern that one or more ions in the glass can undergo.) This non-radiative relaxation, or host quenching as it is sometimes called, leads to the transfer of energy from the rare earth ion to the host glass, where it eventually results in heating the glass. The smaller the value for the highest energy phonon, the more such phonons would have to be emitted in order to bridge the energy gap ΔE and the less probable the non-radiative process. For silicate glasses, the highest energy phonon is about 1100 cm$^{-1}$ in energy; for ZBLAN, it is about 500 cm$^{-1}$; and for Pr$^{3+}$, the value for ΔE between the $^1G_4$ level and the next lower level $^3F_4$ is approximately 3,000 cm$^{-1}$. In silica, only three phonons need be emitted with the result that the fluorescence from the $^1G_4$ level is very severely quenched. In ZBLAN, six phonons are required, and while this does quench the emission from the $^1G_4$ level, it still allows about a 3% efficiency for fluorescence. Such an efficiency level is enough to make useful devices, but which, of course, could be substantially improved.

1. Fluoride

The host for the Pr$^{3+}$ in the present invention can be one of the heavy metal fluoride glasses, ZBLAN for example, as previously mentioned. U.S. Pat. No. 4,674,835 ("MIMURA"), which is incorporated by reference herein, gives representative formulations for ZBLAN glass in mole percent as follows:

$50 \leq ZrF_4 \leq 55$
$16 \leq BaF_2 \leq 24$
$16 \leq NaF \leq 24$
$3 \leq LaF_3 \leq 5$
$2 \leq AlF_3 \leq 4$ The Pr$^{3+}$ can be doped into a ZBLAN core 18 incorporated in a ZBLAN cladding 16 according to the aforementioned structural requirements of a single mode fiber.

Figure 5:
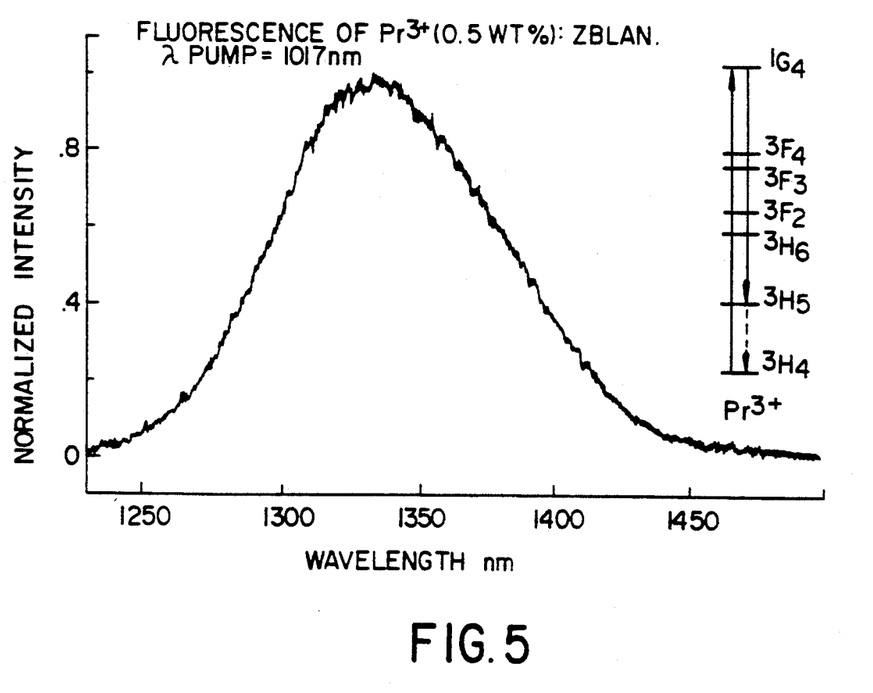
FIG. 5 is a graph showing the normalized fluorescence intensity of $Pr^{3+}$ output wavelength in the $^1G_4$ to $^3H_5$ transition.

FIG. 5 shows the fluorescent spectrum as a function of wavelength in nanometers of the Pr$^{3+}$ (0.5 wt. %) for a ZBLAN glass having the composition in mole % of 57 ZrF$_4$, 28 BaF$_2$, 3 LaF$_3$, 2 AlF$_3$, 10 NaF. The intensity is normalized to give the amplitude of 1.0 at the peak wavelength of 1,340 nm.

2. Infrared Transparent Materials i. Heavy Metals

To improve laser performance, the Pr$^{3+}$ can be added to other host compositions in which the phonon quenching is minimized or effectively eliminated. For example, to obtain fluorescence efficiency superior to that of standard ZBLAN compositions, heavier ions can be substituted for the lighter ions in the ZBLAN compositions. Those ions should be massive and of the same valence state. For example, zirconium ions can be replaced with hafnium and/or thorium, or sodium ions can be replaced by heavier (potassium, rubidium, cesium, or thallium) alkali ions. Alternatively, adding monovalent silver ions (Ag$^{1+}$) in place of sodium ions will improve the energy spectrum without changing the glass structure or stability to any great extent, because the ionic radius of Ag$^{1+}$ is nearly the same as Na$^{+1}$, but the silver is much heavier. In place of the aluminum, one could use yttrium or gadolinium. Also, one could use bismuth or lead in place of zirconium.

ii. Halides

Further, the ZBLAN and heavy metal fluoride compositions can also be improved by replacing fluorides with chlorides, bromides, or iodides, or by using mixtures of ions thereof. These other halides are heavier than fluorine, which would tend to decrease the energy of the phonon spectrum. The following are representative formulations for heavy metal halide core hosts that can be doped and used according to the present invention:

TABLE 1

| | Constituent | Mole Percent |
|---|---|---|
| I. | CdCl | 20 |
| | PbCl | 60 |
| | KI | 20 |
| II. | ZnCl | 50 |
| | ZnBr | 50 |
| III. | ZnCl | 50 |
| | KI | 50 |
| IV. | ZnBr | 50 |
| | KI | 50 |
| V. | ZnBr | 50 |
| | KI | 30 |
| | KBr | 20 |
| VI. | ZnBr | 50 |
| | KI | 25 |
| | KBr | 15 |
| | KCl | 10 | iii. Chalcogenides

Chalcogenides can also be used in place of the halides in the host glass for the Pr$^{3+}$. Chalcogenides are glasses containing sulfur, selenium, or tellurium. A common chalcogenide is roughly 100 mole % arsenic-trisulfide (As$_2$S$_3$), which can be doped with rare earths in the core of the fiber of the present invention.

An indication of the highest energy phonon of the phonon spectrum is the wavelength at which the glass becomes opaque in the infrared region of the spectrum. For ZBLAN, transmission ceases beyond about 6 microns. In As$_2$S$_3$ glass, the glass is transparent out beyond 10 microns.

iv. Chalco-halides

There is still another category of glasses, called the "chalco-halides." Chalco-halides involve a chalcogenide combined with a halide. Chalco-halide glasses can provide a suitable host for lasing the Pr$^{3+}$ dopant. These glasses are transparent out to about 30 microns.

To summarize some of the above, the Pr$^{3+}$ laser system can be viewed as including an optical fiber with a core comprised (and preferably a cladding also comprised) of a host material having the composition $50 \leq X$ halide $\leq 55$
$16 \leq Ba$ halide $\leq 24$
$16 \leq Q$ halide $\leq 24$
$3 \leq La$ halide $\leq 5$
$2 \leq Z$ halide $\leq 4$, wherein X is selected from the group consisting of (Zr, Ha, Th, Bi, Pb, and any combination thereof); Q is selected from the group consisting of (Na, Ag, Rb, Cs, Tl, or a combination thereof); and Z is selected from the group consisting of (Al, Y, Gd, or a combination thereof). The halide can be a fluoride, chloride, bromide, or iodide, or the chore can include at least one chalcogenide and/or at least one chalco-halide.

b. Crystalline

1. Crystalline Hosts

Although the optical fiber 6 is generally referenced herein as a glass host, the host or a part thereof can alternatively be crystalline. For example, a crystalline host can be made of LaBr$_3$, LaCl$_3$, or LaF$_3$. The use of a crystalline host further reduces the phonon quenching because the crystalline symmetry decreases electron-phonon coupling. That is, the crystalline symmetry limits the interaction between the rare earth dopant(s) and the phonon energy vibrations of the host ions.

The formation and drawing processes for an all glass fiber, fiber with a crystalline core and a glass cladding, or an all crystalline fiber are generally similar. To produce a glass cladding 16 and a glass core 18, the process involves very rapidly cooling the fiber to preserve a glass state. Slower cooling permits the formation of crystals. If the composition of the core and cladding have different crystallization temperatures, by controlled cooling, one can produce crystals substantially only in the core 16 or both in the core 16 and in the cladding 18.

Another approach is to have both the core 18 and cladding 16 be crystalline. Such a fiber can be made by extruding a $Pr^{3+}$-containing core 18 inside a non-$Pr^{3+}$ containing cladding 16. The extrusion process produces an optical fiber 6 that is poly-crystalline but nevertheless has a good enough optical quality to be used for some applications.

If crystals need to be reoriented, this can be done by a zone recrystallization procedure. In this procedure, the materials are drawn into a fiber. Then the fiber is remelted slowly in a zone heated furnace that moves along the fiber. The optical fiber 6 briefly melts and cools to crystallize producing a single crystal in the core. This type of optical fiber 6 has a good interface between the core and the cladding and can function at room temperature.

B. Pumping Systems

1. Direct Pumping Systems

Direct pumping generally involves directing light 4 from source 2 to optical fiber 6 so that light beam 4 directly energizes the $Pr^{3+}$. For the $Pr^{3+}$ to be energized, light 4 must be at a wavelength in the range of 0.94 to 1.07 microns, and preferably at in the range of 0.99 to 1.02 microns, which is the peak region for energy absorption for the $^3H_4$-$^1G_4$ transition. For most practical applications, it would be best to use a laser diode as source 2, the diode operating at the peak wavelength that the $Pr^{3+}$ is absorbing. Unfortunately, reliable diodes that produce light at this wavelength are not yet commercially available. When they become available, such diodes would be a good source 2 for directly pumping the $Pr^{3+}$. But other laser pumps can also be used to directly pump the $Pr^{3+}$. For example, a titanium sapphire laser or a dye laser can be tuned to output the wavelengths in the region of 0.99 to 1.02 of 1.02 microns.

2. Indirect Pumping Systems

GaAlAs laser diodes can readily provide light 4 at a wavelength of about 0.8 microns. This wavelength can be used to energize a sensitizer that then gives up its energy to energize the $Pr^{3+}$. Thus, indirect pumping schemes can be used to energize the $Pr^{3+}$ with light 4 from such diodes.

a. Sensitizer Co-dopants

1. Single Ion Sensitizers

One indirect pumping system for energizing the $Pr^{3+}$ involves adding ions of a co-dopant sensitizer to the core 16 when making the optical fiber. The sensitizer ions are energized at a first wavelength by light 4, and energy is then transferred to excite the $Pr^{3+}$ ions to the $^1G_4$ state, which then results in the gain for the wavelength in the range of 1.25 to 1.34 microns.

i. Trivalent Ytterbium ($Yb^{3+}$)

Figure 9:
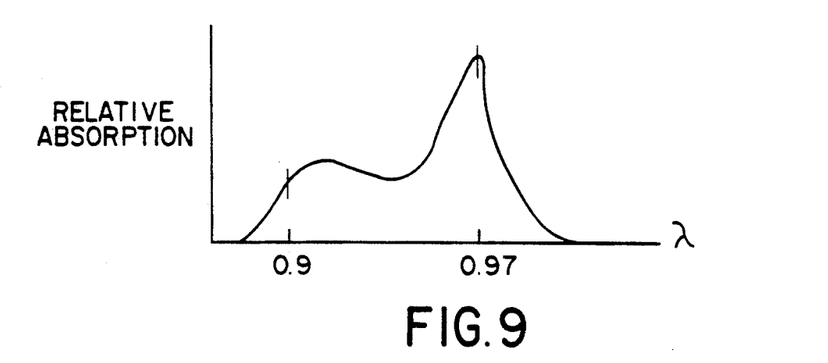
FIG. 9 is a graph of the absorption spectrum for $Yb^{3+}$.

As shown in FIG. 9, $Yb^{3+}$ has a broad absorption band in the region of 0.8 microns to more than 1.06 microns by a transition from the ground state of $^2F_{7/2}$ to the excited state of $^2F_{5/2}$. From the $^2F_{5/2}$ state of $Yb^{3+}$, energy will readily transfer to the $^1G_4$ state of $Pr^{3+}$, thereby effectively increasing the bandwidth for pumping the $Pr^{3+}$. In addition, the strength of the total absorption of pump light is greater because the amount of $Yb^{3+}$ absorption per ion is stronger than that for the $Pr^{3+}$ ion. Moreover, the $Yb^{3+}$ concentration can be increased beyond the concentration limits for $Pr^{3+}$ without concentration quenching. Accordingly, an optical fiber 6 having $Pr^{3+}$ co-doped with $Yb^{3+}$ can use a GaAlAs laser diode as a pump source 2 for producing light 4.

ii. Trivalent Erbium ($Er^{3+}$)

Figure 6:
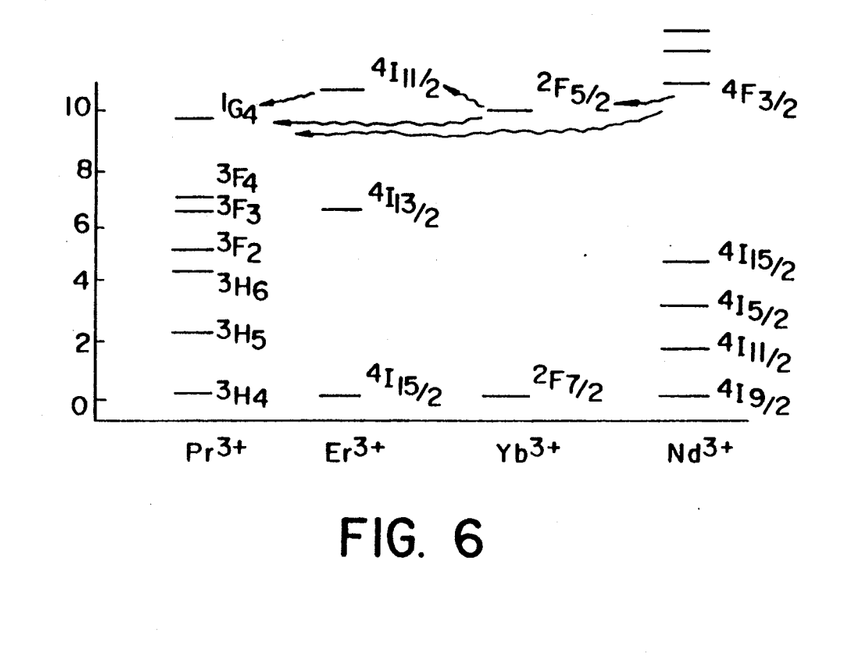
FIG. 6 is a diagram of the energy levels for $Pr^{3+}$, $Er^{3+}$, $Yb^{3+}$, and $Nd^{3+}$.

Other rare earth sensitizers can be used to increase the bandwidth for pumping the $Pr^{3+}$. For example, erbium ($Er^{3+}$) can be used as a sensitizer for $Pr^{3+}$. That is, as illustrated in FIG. 6, the $Er^{3+}$ ion absorbs energy to get into the excited state of $^4I_{11/2}$, and then that excited energy will transfer over to the $^1G_4$ state of the $Pr^{3+}$ ion.

$Er^{3+}$ absorbs light having a wavelength of 0.8 microns, with ions going from the ground state of erbium to the $^4I_{9/2}$ level. There would be a non-radiated transition down to the next lower level, which is the $^4I_{11/2}$ state. The separation between the $^4I_{11/2}$ and the $^4I_{13/2}$ states is large enough that non-radiative relaxation between these states does not occur in ZBLAN glass. Thus, the $Er^{3+}$ can be co-doped with $Pr^{3+}$ in core 16 to transfer energy from the $^4I_{11/2}$ level of $Er^{3+}$ to $Pr^{3+}$ to produce excited $Pr^{3+}$ ions, thereby allowing the use of a GaAlAs laser diode as source 2.

iii. Trivalent Neodymium ($Nd^{3+}$)

Another rare earth sensitizer for $Pr^{3+}$ is neodymium ($Nd^{3+}$), which absorbs light having a wavelength of 0.8 microns to energize the $Nd^{3+}$ to the $^4F_{3/2}$ state. Note in FIG. 6 that $Nd^{3+}$ will florescence essentially only from the $^4F_{3/2}$, state. There could be absorption from the ground state to any of the levels above it, but because the energy separations between those levels are relatively small, there is a very rapid non-radiative decay from one level to the next and then finally to the $^4F_{3/2}$ state. Thus, $Nd^{3+}$ can make an energy transfer to $^1G_4$ state of the $Pr^{3+}$, thereby allowing pumping by a GaAlAs diode as source 2. However, it is undesirable to have too much $Nd^{3+}$ present in the excited state because an excited state absorption in $Nd^{3+}$ could decrease the gain generated by the $Pr^{3+}$.

2. Co-doped Sensitizer Combinations

Combinations of rare earth sensitizers can also be used. For example, source 2 could produce light 4 to energize a combination such as $Yb^{3+}$ and $Er^{3+}$ to indirectly transfer their energy to the $Pr^{3+}$. $Yb^{3+}$ can directly sensitize $Pr^{3+}$ or do so by first sensitizing (for example) $Er^{3+}$, which then transfers its energy to $Pr^{3+}$, or the converse energizing of the sensitizers could occur, depending on the relative concentrations of the ions and the pump wavelength. Similarly, $Nd^{3+}$ can be used in combination with $Yb^{3+}$.

3. Other Ion Multiple Sensitizers

To further increase the operable bandwidth range of light 4, or to tailor the bandwidth for a specific application, other ions can be used as co-dopants to sensitize the above-mentioned sensitizers, that, in turn, sensitize the $Pr^{3+}$. For example, $Pr^{3+}$ and $Nd^{3+}$ can be co-doped with other ions such as chromium ($Cr^{3+}$). The chromium ($Cr^{3+}$) is energized, and the energy is transferred to the $Nd^{3+}$, which, in turn, energizes the $Pr^{3+}$. A table of single and additional ion sensitizers is shown below in TABLE 2.

TABLE 2

| Laser Ion | Single Ion Sensitizer | Added Ion Sensitizer |
| --- | --- | --- |
| $Pr^{3+}$ | $Nd^{3+}$ | $Mo^{3+}$ |
| | | $Mn^{2+}$ |
| | | Ag |
| | | $Ce^{3+}$ |
| | | $Cr^{3+}$ |
| | $Yb^{3+}$ | $Nd^{3+}$ |
| | | $Ce^{3+}$ |
| | | $Cr^{3+}$ |
| | $Er^{3+}$ | $Yb^{3+}$ | b. Multi-element Pump Configurations

1. Core and Filter

Figure 7:
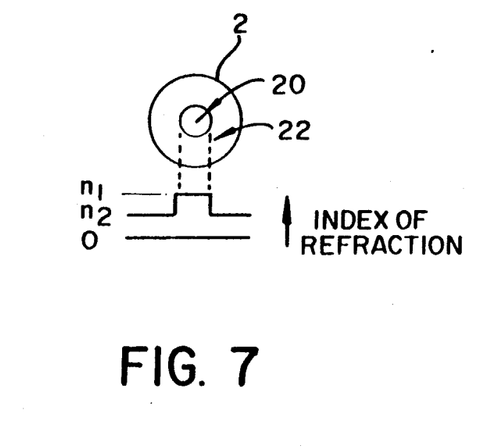
FIG. 7 is a diagram of a pump fiber laser for the present invention.

There are other kinds of pump systems that could be used to provide light 4 for the present invention. For example, with reference to FIG. 7, the pump 2 can be an optical fiber laser with laser core 20 in laser cladding 22 and powered to generate the light 4 that inputs to $Pr^{3+}$ fiber laser 6. The optical fiber laser for pump 2 can be made by any of the methods of making an optical fiber discussed or referenced herein.

Figure 8:
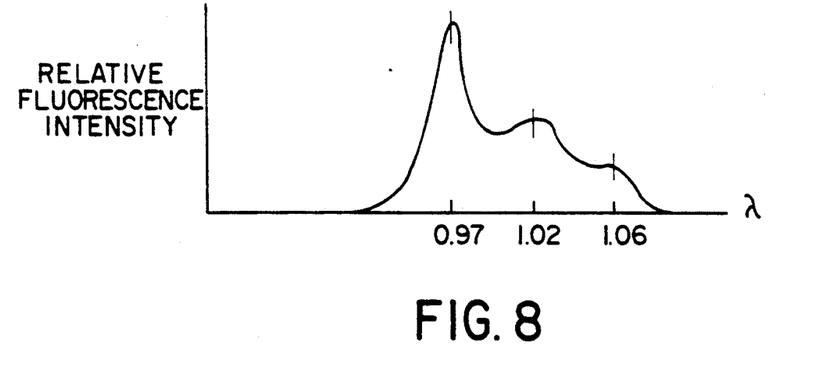
FIG. 8 is a graph of the fluorescent emission for $Yb^{3+}$.

The pump core 20 can, for example, have $Yb^{3+}$ to produce a fluorescent emission in a silicate glass as shown in FIG. 8. The corresponding absorption spectrum is shown in FIG. 9. The $Yb^{3+}$ may be pumped directly in the region of about 0.8 to about 1.06 microns. If the pump wavelength is restricted to the region of 0.9 to 0.95 microns, it is possible to obtain laser action at 0.97, 1.02, or 1.06 microns, as shown in FIG. 8. However, a direct $Yb^{3+}$ pumped fiber can be fabricated with a geometry and composition that effectively is preselected for laser pump emission only in the region of 1.02 microns, as set forth below. In this case, the pump is linked to the $Pr^{3+}$ fiber by means of a coupler, as is discussed subsequently herein.

It should be noted that one can alternatively pump the $Yb^{3+}$ in the optical fiber laser indirectly, say, by energy transfer from $Nd^{3+}$ (or by means of the other dopants mentioned herein). In this case, the $Nd^{3+}$ would absorb the pump light at about 0.8 microns. This would excite the $Nd^{3+}$ to the $^2H_{9/2}$ level. Then the excited $Nd^{3+}$ relaxes to the $^4F_{3/2}$ level, from which it transfers energy to the $^2F_{5/2}$ level of the $Yb^{3+}$.

Figure 10:
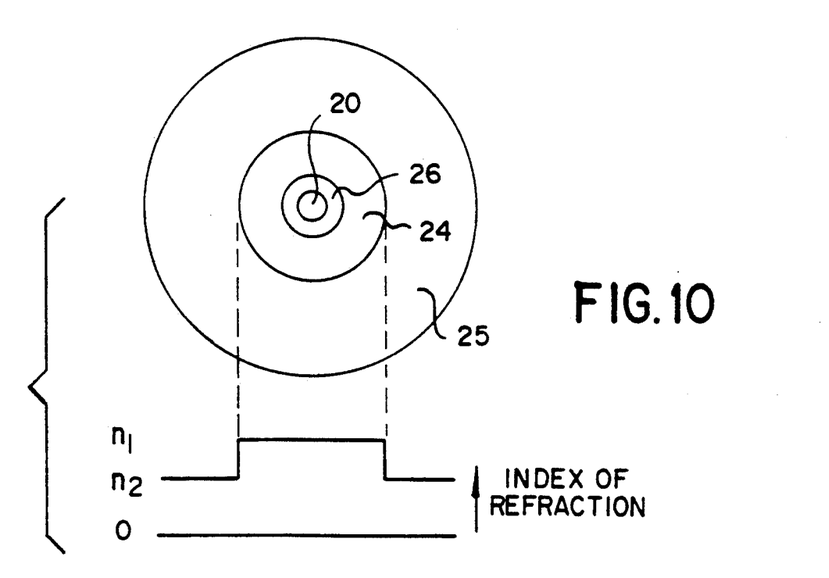
FIG. 10 is a diagram of a multi-element single mode core structure for the present invention.

An alternate geometry for the pump 2 involving the $Yb^{3+}$-containing optical fiber laser core 20 is illustrated in FIG. 10. To output the preferred pre-selected laser pump emission at 1.02 microns, one can discriminate against the 0.97 micron emission transition by limiting the pump power or by pumping at or near 0.97 microns. To eliminate the possibility of lasing at 1.06 microns, a double core fiber can be fabricated with a single mode core for emission at 1.02 microns, but having three regions. The central core 20 region contains the $Yb^{3+}$ and, if desired, the sensitizer(s) such as $Nd^{3+}$. There is a second region 24 that is in the form of an annulus doped to provide light filtration, for example, doped with 0.1 to 5 weight percent of trivalent samarium ($Sm^{3+}$). Another annulus 26 substantially devoid of rare earth elements, but having essentially the same index of refraction as the other two regions, is located between the laser core 20 and the second region 24 to limit interdiffusion of the respective constituents. The second region 24 with the $Sm^{3+}$ provides a filter that absorbs light having wavelengths of about 1.06 microns, but that is essentially transparent to light having a wavelength of 1.02 microns. The multi-element core pump is located within cladding 25.

If the $Nd^{3+}$ and the $Yb^{3+}$ are used together in the center core 20 region, pumping can be accomplished with a laser diode outputting light 4 to the region at about from 0.72 microns to 0.9 microns. If only $Yb^{3+}$ is used, the diode pump wavelengths can be restricted to a relatively narrower band, in the range of about 0.80 microns to 0.90 microns.

2. Without Filter

Still another multi-core pump 2 configuration can be constructed as discussed above with reference to FIG. 10, except without the presence of the $Sm^{3+}$ annulus for the core 20 doped with the $Yb^{3+}$ but essentially devoid of the $Nd^{3+}$. Pump 2 can comprise two components. The first component is a high power laser diode pump laser, which typically has an emission area of about 2 microns wide by about 100 microns, or longer (e.g., 300 microns), or even 1 mm long. The output can be in excess of 5 watts in the wavelength region of 0.8 microns to 0.98 microns. This output is multi-mode and cannot be directly coupled into the end of a single mode $Pr^{3+}$ fiber core 16. However, the output can serve to pump the second component, a $Yb^{3+}$-containing single mode core in an optical fiber located between the high powered laser diode pump and the optical fiber 6. The $Yb^{3+}$-containing core would have a double clad configuration as described below in connection with FIG. 13. However, if $Sm^{3+}$ is not used as a filter in the second component, it is important to control the doping, the reflectors, and the pump power so as to provide laser emission at 1.02 microns.

Also, in a configuration similar to that described in the immediately preceding paragraph, where Sm is not used, if the $Yb^{3+}$-containing core is co-doped with $Nd^{3+}$, the concentrations of $Yb^{3+}$ and $Nd^{3+}$, the pump light intensity, the wavelength, the fiber length, and the end reflectors must be selected to give laser emission at 1.02 microns and not at 1.06 microns.

Figure 11:
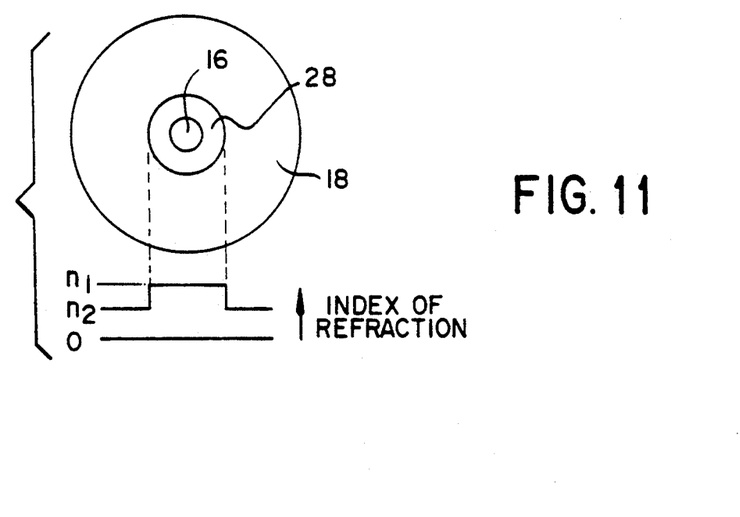
FIG. 11 is a diagram of another diagram of a multi-element for the present invention.

Still another pumping configuration is illustrated in FIG. 11. A $Yb^{3+}$-containing annulus 28 can be made to have the $Pr^{3+}$-containing core 16 inside it. Together, the annulus 28 around core 16 form a single mode core within cladding 18. That is, the dimensions are such that when the $Yb^{3+}$ lases, a single mode field distribution associated with the single mode core covers both the central core region and the annulus region. Similarly, when the $Pr^{3+}$ lases, the light at about 1.3 microns will cover both regions as well, but the $Yb^{3+}$ does not absorb at this wavelength at all and hence would not interfere with the $Pr^{3+}$ laser action.

Figure 12:
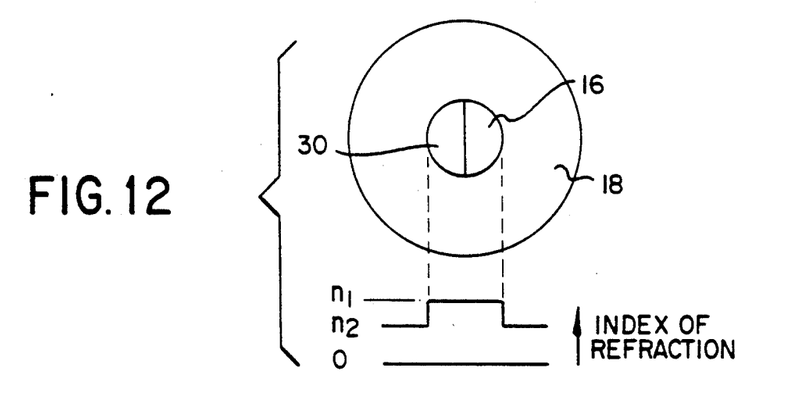
FIG. 12 is a diagram of a multi-element core structure for the present invention.

Still another multi-element core configuration is shown in FIG. 12. There is a single core with a double region in it: a semi-circular core section 16 doped with $Pr^{3+}$ is located next to another semi-circular core section 30 doped with $Yb^{3+}$ with or without the sensitizers mentioned herein. The light conducting path for the single mode light in the optical fiber 6 overlaps both regions. A general way of describing the configuration of FIG. 12 is that the core has two regions, one of which contains $Yb^{3+}$ and the other one has the $Pr^{3+}$. The laser emission for both materials involves a light conducting path that is common to both wavelengths. The $Yb^{3+}$ laser light at 1.02 microns is absorbed by the $Pr^{3+}$, which can then subsequently lase or amplify light at 1.3 microns. Of course, in any of the above multi-core configurations, which can be made according to the aforementioned methods, the $Yb^{3+}$ and the $Pr^{3+}$ regions or components can have the other sensitizers mentioned herein.

3. Multi-element Cladding Configuration

Figure 13:
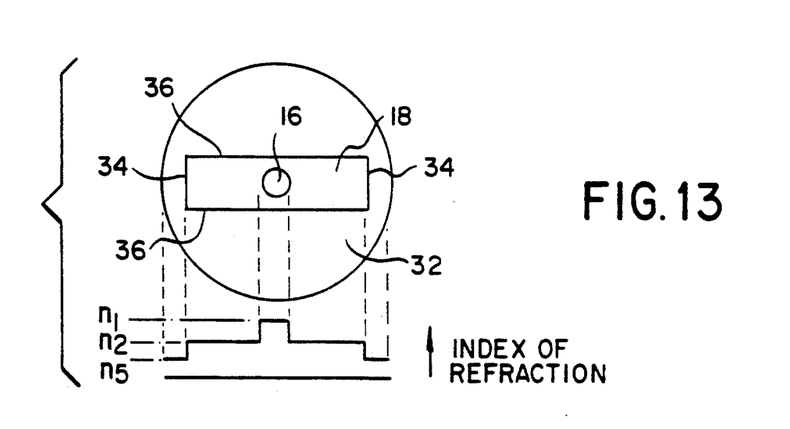
FIG. 13 is a diagram of a multi-element clad structure for the present invention.

Optical fiber 6 can also be a multi-clad configuration having with core 16 surrounded by a first cladding 18 of a lower refractive index, which, in turn, is surrounded by a second cladding 32 of a still lower refractive index, as illustrated in FIG. 13. Pump light 4 is coupled into the first cladding 18, and as it propagates down the optical fiber 6, the light 4 is absorbed by the $Pr^{3+}$ or the $Pr^{3+}$ plus sensitizer(s) in the core 16.

A multi-element cladding configuration can be made according to the aforementioned methods, and the core and cladding regions can have the other sensitizers mentioned herein. It is convenient to make the first cladding 18 rectangular in shape with short sides 34 about 40 microns long and long sides 36 of sufficient length to permit butt coupling from a high output power laser diode. The sides can be made by grinding and polishing flats on a circular rod used for the core and first cladding.

C. Laser Devices Incorporating the Optical Fiber 6

Any of the aforementioned techniques can be used to construct the optical fiber 6 doped with $Pr^{3+}$. The optical fiber 6 is then incorporated into the laser device 10 as shown in FIG. 1. Device 10 can be an oscillator or an amplifier, each of which is discussed below. In any case, however, application 14 uses light 12 produced by the optical fiber 6 via the $^1G_4$-$^3H_5$ transition.

1. $Pr^{3+}$ Laser Amplifier

Figure 14:
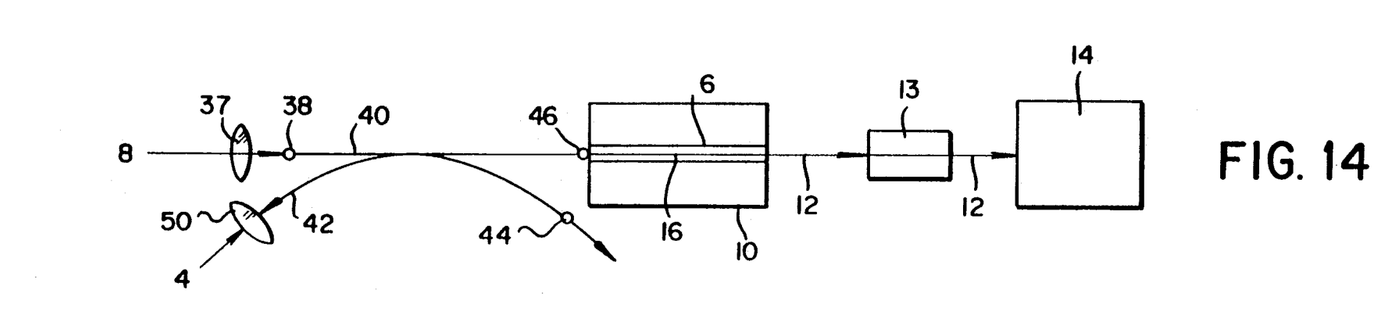
FIG. 14 is a diagram of the present invention incorporated into an amplifier.

A preferred application of the present invention is an amplifier, as illustrated generally in FIG. 14. FIG. 14 shows signal light 8 being inputted via lens 37 into one of the input ports 38 of a dispersive coupler 40. (Alternatively, the signal 8 can be inputted via a fiber splice.) Light 4 from source 2 is coupled to a second input port 42 of the dispersive coupler 40 by lens 50. A dispersive coupler is a commercially available component available, for example, from Gould Fiber Optics Division, Glen Burnie, Md. The properties of a dispersive coupler vary with the wavelength to permit the input light from both ports to be combined and the output to be predominantly at one of the output ports. First output port 44 outputs a small portion of pump light 4 and signal light 8, 10% or less, that can be used for monitoring the laser system. Second output port 46 outputs most of pump light 4 and signal light 8 into core 16 of optical fiber 6, either directly or by means involving at least one sensitizer. When there are more ions in the excited state than in the ground state and enough additional population inversion to overcome any system losses, the light 8 gets amplified. After laser device 10 amplifies the signal light 8, which can be outputted as light 12 to an optical isolator 13, which removes undesired back reflection as light 12 is coupled into the applications system 14.

What has been described is an amplifier in which the signal light 8 and the pump light 4 are made to enter from the same side of the amplifier, laser device 10. This configuration is a co-propagating pump scheme. Alternatively, one may have the signal light 8 enter one end of the fiber 6 and the pump light 4 enter from the other end through a similar type of dispersive coupler. This second configuration is a counter-propagating pump scheme. A third approach is to have the pump light come in from both ends, which is called a bi-directional pump scheme. In any of these cases, the pump light and the signal light are coupled into the $Pr^{3+}$-doped core 18.

In indirect pumping systems, the pump light 4 is coupled into whatever region of optical fiber 6 that has the sensitizer(s) or pump laser emitter, and while propagating down the region, the light 4 transfers energy to the sensitizer(s) or pump laser emitter, that in turn transfers energy to whatever region has the $Pr^{3+}$. The signal light, however, is coupled directly into the core 18 region with the $Pr^{3+}$, from which the amplified signal is emitted.

2. Oscillator

Figures 15, 16:
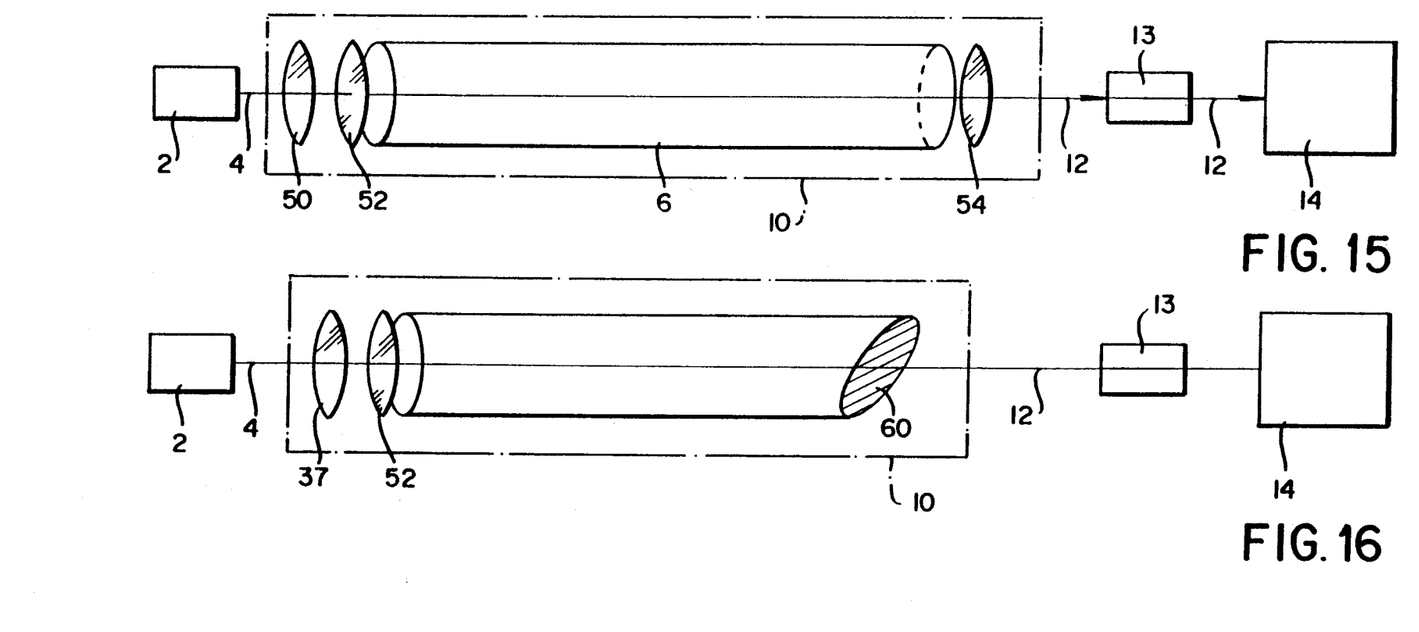
FIG. 15 is a diagram of the present invention incorporated into an oscillator.
FIG. 16 is a diagram of superluminescence source for the present invention.

An oscillator, is illustrated in FIG. 15, where there is shown a light source 2 inputting light 4 to the optical fiber 6 via a focusing lens 50. The oscillator device 10 has a first reflector 52 and a second reflector 54 at respective ends of the optical fiber 6, an optical fiber. The reflectors 52 and 54 are "dichroic" reflectors. That is, reflectors 52 and 54 have reflectivity values that are a function of the wavelength of the light.

Each reflector can be made either by a deposit of a thin film multi-layer dielectric deposited on the ends of the optical fiber 6 or deposited on a thin (e.g., 10 mil) sheet of glass or other material placed against the ends of optical fiber 6. Alternatively, a dichroic reflector can be made from a photo-refraction grating formed within the core 16 (not shown in FIG. 15).

The oscillator has one dichroic reflector 52 which has a high reflectivity at the wavelength of the laser output light 12, but has a low reflectivity (i.e., it is essentially transparent), at the wavelength of the input pump light 4. For example, for the $Pr^{3+}$ doped fiber, a pump light 4 wavelength can be in the range of approximately 0.94 microns to 1.07 microns and over this range, the dichroic reflector 52 should be substantially transparent. (Typically, though, a practical dichroic reflector for pump light may have a reflectivity down to only about 15%, or down to 2 or 3% for a higher performance dichroic reflector.) The laser output light 12 may or may not pass through isolator 13 before incidenting on applications system 14.

Reflector 52 should have a high reflectivity at the laser wavelength. At the laser wavelength, the reflectivity should be about 99% for high performance, but practical considerations may limit this to about 96% reflectivity. In contrast, reflector 54 should have a reflectivity of 70% to 95% at the laser wavelength and preferably a high reflectivity at the pump wavelength.

The oscillator gets pump light 4 to excite the $Pr^{3+}$ to the $^1G_4$ energy level. From the $^1G_4$ level, a fluorescence occurs that is commonly referred to as "spontaneous emission." Spontaneous emission involves exciting a media to an excited state by absorbing photons directly (or by energy transfer from a sensitizer that has absorbed energy and transferred the energy to a fluorescent material), which then re-emits other photons—usually at a different wavelength, most often at a longer wavelength. This is the process of fluorescence.

In an oscillator, some of the spontaneous emission propagates down the fiber. Of the total spontaneous emission, only a fraction is coupled into the fiber core and propagates down the fiber. Most of the fluorescent light is emitted out the side of the fiber.

However, if there are more ions in the excited state than in the terminal state (and the terminal state for $Pr^{3+}$ is the $^3H_5$ level), the net result is that the spontaneously emitted light that propagates down the fiber gets amplified as it propagates down the optical fiber 6 in either direction. This amplification must overcome losses associated with scattering and absorption, plus the losses associated with end reflectors 52 and 54 that have reflectivities less than 100%. Thus, to operate the oscillator, the gain associated with induced emission from the $^1G_4$ state down to the $^3H_5$ state has to be sufficient to overcome the losses from propagating light in the fiber together with end reflector losses. Once the gain is greater than the losses, laser oscillation occurs, and the more light that is pumped in, the more laser light that is generated, and the more the light output from the system.

There are different approaches that can be taken to extracting laser energy from the oscillator system. The second reflector 54 can have a lower reflectivity at the laser wavelength for light 12. The result is that light can readily get out from only one end of the optical fiber 6, but there is still a relatively high amount of reflection in order to get laser oscillations going. A suitable range of values of the output reflectivity for the laser wavelength for light 12 in the range of 1.25 to 1.34 microns would be between about fifty to about ninety five percent, preferably in the range of seventy to ninety five percent.

The length of the optical fiber 6 is also an important consideration in the design of an oscillator device 8. If the optical fiber 6 is long enough, the pump light 4 will essentially be entirely absorbed before it traverses the length of the optical fiber 6. If this is done intentionally, it really does not matter what the reflectivity is at the pump wavelength for the reflector at the end that is not pumped. But for most applications, it is desirable to minimize the length of the optical fiber 6 to avoid unnecessary pump power losses of light 4.

In an alternative configuration, the reflector 54 can employ a dichroic which is a good reflector at the wavelength for light 4 so that the pump source light 4 is reflected back to make a second pass in the optical fiber 6. Choose the length of optical fiber 6 so that only 50% to 60% of the pump light is absorbed in a single traverse through the fiber On a second pass, again 50% or 60% of the light is absorbed.

In general, it is desirable to minimize the length of the fiber without significantly sacrificing the absorption of the pump light 4. One benefit of a shorter length fiber is that it is less expensive than a longer fiber. Another benefit is that it reduces ground state absorption, and in the case of $Pr^{3+}$, there is a ground state absorption at the laser wavelength. Although the absorption is weak, it nevertheless results in some reduction in the gain.

3. Superluminescence Source

Another laser device 10 involves a superluminescence source illustrated in FIG. 16, which does not use a coherent input signal (such as a communications signal 8) but instead uses the spontaneous emission that gets amplified. This is a very bright optical element 6 having a linewidth and other properties that look like ordinary fluorescence, i.e., low coherence; a superluminescent source is like the spontaneous emission but it is much brighter.

FIG. 16 shows source 2 outputting pump light 4. Source 2 can be a pump light source similar to what was used for the other $Pr^{3+}$ laser devices discussed herein. Light 4 passes through lens 37, which focuses the light 4 on optical fiber 6 so as to directly or indirectly energize the $Pr^{3+}$. Light 4 first passes through dichroic end reflector 52, which is transparent to light 4 but highly reflective to light produced in superluminescent source device 10. There is no output end reflector, and instead, there can be an anti-reflection coated end or the end surface cut at an angle of 10 to 20 degrees off perpendicular to the axis of the fiber, to minimize the end reflection. Light 12 passes through optical isolator 13 and on to application 14.

D. Applications 14 Incorporating a Laser Device

1. Gyroscope

One application 14 for the superluminescence source is a fiber optic gyroscope, the fiber optic gyroscope of the so called "interferometric" type. For example, application 14 can be the fiber optic gyroscope that is described in U.S. Pat. No. 4,637,025 titled "Superluminescent Light Source" (Elias Snitzer and Shaoul Ezekiel), incorporated by reference herein.

2. $Pr^{3+}$ Laser Sensor

Another application 14 for the present invention is in connection with a sensor system in which it is desirable to have a light source emitting at about the 1.3 microns, for example, to analyze compositions or for medical uses that take advantage of varying reflectance by blood at about 1.3 microns for varying amounts of sugar in the blood. For example, application 14 can be the medical sensor that is described in U.S. Pat. No. 5,054,487 titled "Laser Systems for Material Analysis Based on Reflectance Ratio Detection" (Richard H. Clark), incorporated by reference herein. Alternatively, application 14 can be the medical sensor that is described in U.S. Pat. No. 4,882,492 titled "Non-invasive Near Infrared Measurement of Blood Analyte Concentrations" (Kenneth J. Schlager), incorporated by reference herein.

3. Communications a. Amplifier

Optical amplifiers are important devices in an application such as a communications system. Such amplifiers permit substantial versatility in fiber circuitry and do so at lower cost than would be required for a system with repeater stations comprising optical detectors and modulated light sources.

Of particular value is the ability to do wavelength division multiplexing, wherein the same amplifier is used to amplify a number of different signals at slightly different frequencies—all of which are within the gain bandwidth of the $Pr^{3+}$ amplifier of the present invention. One version of an optical amplifier suitable for incorporation of the present invention is described in U.S. Pat. No. 4,712,075 "Optical Amplifier" (Elias Snitzer), incorporated by reference herein.

b. Oscillator

There are many uses for the laser oscillator of the present invention. For communications purposes instead of using a laser diode, as is now commonly done, a $Pr^{3+}$ laser source can be used with an external modulator. The $Pr^{3+}$ laser would operate continuously, but between the output of the $Pr^{3+}$ laser and the fiber transmission line, there is a modulator. The modulator communicates information via the laser output by changing some characteristic of the light, such as its intensity. This approach also permits wavelength division multiplexing. In wavelength division multiplexing, various communications channels are closely spaced so that the same $Pr^{3+}$ oscillator can amplify all the channels. Communications systems suitable for such an application 14 have been described above.

In addition, the light from the $Pr^{3+}$ oscillator can be polarized by incorporating polarizing elements between the reflectors and the optical fiber 6. By this means, application 14 can be the transmission system that is described in U.S. Pat. No. 5,007,693 titled "Method for Controlling Polarizations of Signal Lights in an Optical Frequency Division Multiplex Coherent Communication System; U.S. Pat. No. 4,817,206 titled "Optical-Fiber Transmission System with Polarization Modulation and Coherent Detection" (Riccardo Calvani; Renato Caponi; and Francesco Cisterno), incorporated by reference herein. Application 14 can also be the communications system that is described in U.S. Pat. No. 4,775,972 titled "Optical Fiber Communications for Local Area Networks with Frequency-Division-Multiplexing" (Charles C. Ih and Charles K. Kao), incorporated by reference herein.

4. Printer

In thermal printers, heat causes a transfer of dark material from one surface to an adjacent surface to facilitate printing. For such a printer, it is desirable to have a high intensity laser beam to accomplish this printing rapidly. Furthermore, it is desirable to have laser action at many wavelengths to produce a smooth printing free of speckle. In accordance with the present invention, a $Pr^{3+}$ fiber lase can be used in such thermal printers.

With the addition of a light intensity modulator for processing light just prior to receipt by application 14, application 14 can be the laser printer that is described in U.S. Pat. No. 5,018,805 titled "Laser Printer" (David Kessler); U.S. Pat. No. 4,984,182 titled "Laser Printer Controller Flexible Frame Buffer Architecture Which Allows Software to Initiate the Loading of a Frame Buffer Stare Address" (Hershow Chang; Scong Kim; and Tetsuaro Motoyama), or U.S. Pat. No. 4,933,874 titled "Printer" (Kenichirou Asada; Yoshiki Yoshida; and Kazuo Murai), all of which are incorporated by reference herein.

We claim:

1. A system for producing an optical gain, the system comprising:
   an optical fiber having a core and a cladding, the core being doped with $Pr^{3+}$; and
   a light source producing light at a wavelength in the range of from about 0.94 to 1.07 microns to energize the $Pr^{3+}$ to the $^1G_4$ state and produce an optical gain by a $^1G_4$-$^3H_5$ transition for light at a wavelength in the range of 1.25 to 1.34 microns.

2. A method for making a laser system to produce an optical gain, the method comprising the steps of:
   forming an optical fiber having a core and a cladding, the core being doped with $Pr^{3+}$;
   connecting the optical fiber core to a light source providing light at a wavelength in the range of from about 0.94 to 1.07 microns operable to energize the $Pr^{3+}$ to the $^1G_4$ state to produce an optical gain by a $^1G_4$-$^3H_5$ transition for light at a wavelength in the range of 1.25 to 1.34 microns.

3. A method for using a laser system to produce an optical gain, the method comprising the step of energizing a core doped with $Pr^{3+}$ in a cladding of an optical fiber with a light at a wavelength in the range of from about 0.94 to 1.07 microns to energize the $Pr^{3+}$ to the $^1G_4$ state to produce an optical gain by a $^1G_4$-$^3H_5$ transition for light at a wavelength in the range of 1.25 to 1.34 microns.

4. The system of claim 1, wherein the core has an index of refraction ($n_1$), and the cladding has a lower index of refraction ($n_2$), and from these two indexes or refraction, a quantity called the numerical aperture (NA) can be defined as follows:

$$NA = (n_1^2 - n_2^2)^{\frac{1}{2}};$$

wherein a "V" value is equal to a quantity $\pi$ (3.1416 . . . ) times the diameter of the core (d) divided by the wavelength $\lambda$ of propagation and then multiplied by the NA, such that $$V = \frac{\pi d}{\lambda} NA;$$

and wherein $V < 2.405$.

5. The system of claim 4, wherein V ranges from about 1.0 to 2.4.

6. The system of claim 4, wherein V is about 1.5 to 2.3.

7. The system of claim 1, wherein the core has an index of refraction ($n_1$), and the cladding has a lower index of refraction ($n_2$), and from these two indexes of refraction, a quantity called the numerical aperture (NA is defined as follows:

$$NA = (n_1^2 - n_2^2)^{\frac{1}{2}};$$

and wherein NA ranges from about 0.02-1.0.

8. The system of claim 7, wherein NA ranges from about 0.12 to 0.17.

9. The system of claim 7, wherein NA is 0.12 to 0.17.

10. The system of claim 7, wherein the optical fiber is a single mode optical fiber.

11. The system of claim 7, wherein the optical fiber is made of glass.

12. The system of claim 11, wherein the optical fiber is comprised of a host material having the composition
$50 \leq ZrF_4 \leq 55$
$16 \leq BaF_2 \leq 24$
$16 \leq NaF \leq 24$
$3 \leq LaF_3 \leq 5$
$2 \leq AlF_3 \leq 4$.

13. The system of claim 11, wherein the optical fiber is comprised of a host material having the composition
$50 \leq X\ halide_4 \leq 55$ $16 \leq BaF\ halide_2 \leq 24$ $16 \leq Q\ halide \leq 24$ $3 \leq LaF\ halide_3 \leq 5$ $2 \leq Z\ halide_3 \leq 4$, wherein X is selected from the group consisting of Zr, Ha, Th, Bi, Pb, and any combination thereof;

Q halide is selected from the group consisting of Na, Ag, Rb, Ce, Tl, or a combination thereof; and Z is selected from the group consisting of Al, Y, Gd, or a combination thereof.

14. The system of claim 13, wherein the halide is a fluoride.

15. The system of claim 13, wherein some but not all of the halide is a fluoride.

16. The system of claim 11, wherein the optical fiber is comprised of a fluoride host.

17. The system of claim 11, wherein the optical fiber is made of a heavy metal fluoride host.

18. The system of claim 11, wherein the optical fiber is comprised of a halide other than a fluoride.

19. The system of claim 11, wherein the optical fiber is comprised of a heavy metal halide other than a fluoride.

20. The system of claim 11, wherein the optical fiber is made of an infra-red transparent glass.

21. The system of claim 11, wherein the optical fiber is comprised of at least one chalcogenide.

22. The system of claim 11, wherein the optical fiber is comprised of at least one chalco-halide.

23. The system of claim 1, wherein the optical fiber has a crystalline core.

24. The system of claim 1, wherein the core is doped with less than 0.1 weight percent of $Pr^{3+}$.

25. The system of claim 1, wherein the source is comprised of a titanium sapphire laser.

26. The system of claim 1, wherein the source is comprised of a dye laser.

27. The system of claim 1, wherein the source is comprised of a diode.

28. The system of claim 1, wherein the light produced by the source is at a wavelength within the range of 0.94 to 1.07 microns.

29. The system of claim 1, wherein the light produced by the source is at a wavelength of 0.99–1.02 microns.

30. The system of claim 1, wherein the source is comprised of an indirect pump.

31. The system of claim 30, wherein the source is comprised of a sensitizer.

32. The system of claim 31, wherein the source is comprised of a sensitizer co-doped with the $Pr^{3+}$.

33. The system of claim 31, wherein the sensitizer is $Yb^{3+}$.

34. The system of claim 31, wherein the sensitizer is $Er^{3+}$.

35. The system of claim 31, wherein the sensitizer is $Nd^{3+}$.

36. The system of claim 31, wherein the sensitizer is a combination selected from at least two of the group consisting of $Nd^{3+}$, $Er^{3+}$, and $Yb^{3+}$.

37. The system of claim 31, wherein the sensitizer is $Nd^{3+}$ in combination with an added ion sensitizer selected from the group consisting of $Mo^{3+}$, $Mn^{2+}$, Ag, $Ce^{3+}$, $Cr^{3+}$, or any combination thereof.

38. The system of claim 31, wherein the sensitizer is $Er^{3+}$ in combination with an added ion sensitizer selected from the group consisting of $Yb^{3+}$, $Mo^{3+}$, or any combination thereof.

39. The system of claim 31, wherein the sensitizer is $Yb^{3+}$ in combination with an added ion sensitizer selected from the group consisting of $Cr^{3+}$, $Nd^{3+}$, $Ce^{3+}$, or any combination thereof.

40. The system of claim 1, wherein the source is comprised of a multi-core optical fiber.

41. The system of claim 1, wherein the source is comprised of a multi-core optical fiber having a filter between the core and the cladding.

42. The system of claim 41, wherein the filter is comprised of a samarium-doped filter between the core and the cladding.

43. The system of claim 1, wherein the source and the optical fiber are integral.

44. The system of claim 1, wherein the source and optical fiber are integral and comprised of a multi-core optical fiber having two adjacent sections, each section being semicircular in cross section, one of said sections being doped with $Pr^{3+}$.

45. The system of claim 44, wherein the other section is doped with a sensitizer.

46. The system of claim 1, wherein the source is comprised of a multi-clad optical fiber.

47. The system of claim 1, wherein the optical fiber is located in an amplifier to produce the optical gain.

48. The system of claim 1, wherein the optical fiber is located in an oscillator to produce the optical gain.

49. The system of claim 48, wherein the optical fiber is located between two dichroic reflectors in the oscillator and wherein the oscillator is a double pass oscillator.

50. The system of claim 49, wherein one of the reflectors is an exit reflector capable of reflecting 70–95% of the light at a wavelength in the range of 1.2 to 1.3 microns but practically 100% at the wavelength of the light produced from the source; and wherein the concentration of the $Pr^{3+}$ and length of the fiber give an absorption of the light produced from the source of between 50% and 60% for a single pass.

51. The system of claim 1, wherein the optical fiber is located in a superluminescence source to produce the optical gain.

52. The system of claim 1, further comprising a communications system receiving energy from the optical gain.

53. The system of claim 1, wherein the optical fiber is located in a gyroscope to produce the optical gain.

54. The system of claim 1, further comprising a laser printer receiving energy from the optical gain.

55. The system of claim 1, further comprising a sensor receiving energy from the optical gain.

56. A composition for the manufacture of a core for an optical fiber capable of producing an optical gain by a $^1G_4$-$^3H_5$ transition at a wave length of 1.25 to 1.34 microns comprising:

A. $Pr^{3+}$.

B. A host material selected from the group consisting of:

1. $50 \leq X\ halide \leq 55$ $16 \leq BaF\ halide \leq 24$ $16 \leq Q\ halide \leq 24$ $3 \leq La\ halide \leq 5$ $2 \leq Z\ halide \leq 4$, wherein X is selected from the group consisting of Zr, Ha, Th, Bi, Pb, and any combination thereof; Q is selected from the group consisting of Na, Ag, Rb, Ce, Tl, or a combination thereof; and Z is selected from the group consisting of Al, Y, Gd, or any combination thereof;
2. A chalcogenide, a chalco-halide and combinations thereof; and
3. A halide of a metal selected from the group consisting of Cd, Pb, K, Zn and any combination thereof.

57. A composition as set forth in claim 56, wherein a co-dopant is added from the group consisting of: Yb, Er, Nd, or any combination thereof.

58. A composition as set forth in claim 57, wherein an added sensitizer is included from the group consisting of: Mo, Mn, Ag, Ce, Cr, or any combination thereof.

59. A method as described in claim 2 which includes the step of preparing a host material composition for forming the optical fiber which comprises:
$50 \leq X$ halide$_4 \leq 55$
$16 \leq BaF$ halide$_2 \leq 24$
$16 \leq Q$ halide $\leq 24$
$3 \leq LaF$ halide$_3 \leq 5$
$2 \leq Z$ halide$_3 \leq 4$, wherein
X is selected from the group consisting of Zr, Ha, Th, Bi, Pb, and any combination thereof;
Q halide is selected from the group consisting of Na, Ag, Rb, Ce, Tl, or a combination thereof; and
Z is selected from the group consisting of Al, Y, Gd, or a combination thereof.

60. A method as described in claim 59 wherein the host material composition includes a sensitizer.

61. A method as described in claim 60 wherein the host material composition includes a sensitizer selected from the group consisting of $Nd^{3+}$, $Er^{3+}$, and $Yb^{3+}$.

62. A method as described in claim 61 wherein the sensitizer is $Nd^{3+}$.

63. A method as described in claim 61 wherein the sensitizer is $Er^{3+}$.

64. A method as described in claim 61 wherein the sensitizer is $Yb^{3+}$.

65. A method as described in claim 61 wherein the sensitizer is a combination selected from at least two of the group of $Nd^{3+}$, $Er^{3+}$ and $Yb^{3+}$.

66. A method as described in claim 62 wherein an additional ion sensitizer selected from the group consisting of $Mo^{3+}$, $Mn^{2+}$, Ag, $Ce^{3+}$, $Cr^{3+}$ or any combination thereof is added.

67. A method as described in claim 63 wherein an additional ion sensitizer selected from the group consisting of $Yb^{3+}$, $Mo^{2+}$ or any combination thereof is added.

68. A method as described in claim 64 wherein an additional ion sensitizer selected from the group consisting of $Cr^{3+}$, $Ce^{2+}$, $Nd^{3+}$ or any combination thereof is added.

69. A method as described in claim 3 which includes the step of preparing a host material composition for forming the optical fiber which comprises:
$50 \leq X$ halide$_4 \leq 55$
$16 \leq BaF$ halide$_2 \leq 24$
$16 \leq Q$ halide $\leq 24$
$3 \leq LaF$ halide$_3 \leq 5$
$2 \leq Z$ halide$_3 \leq 4$, wherein
X is selected from the group consisting of Zr, Ha, Th, Bi, Pb, and any combination thereof;
Q halide is selected from the group consisting of Na, Ag, Rb, Ce, Tl, or a combination thereof; and
Z is selected from the group consisting of Al, Y, Gd, or a combination thereof.

70. A method as described in claim 69 wherein the host material composition includes a sensitizer.

71. A method as described in claim 70 wherein the host material composition includes a sensitizer selected from the group consisting of $Nd^{3+}$, $Er^{3+}$, and $Yb^{3+}$.

72. A method as described in claim 71 wherein the sensitizer is $Nd^{3+}$.

73. A method as described in claim 71 wherein the sensitizer is $Er^{3+}$.

74. A method as described in claim 71 wherein the sensitizer is $Yb^{3+}$.

75. A method as described in claim 71 wherein the sensitizer is a combination selected from at least two of the group of $Nd^{3+}$, $Er^{3+}$ and $Yb^{3+}$.

76. A method as described in claim 72 wherein an additional ion sensitizer selected from the group consisting of $Mo^{3+}$, $Mn^{2+}$, Ag, $Ce^{3+}$, $Cr^{3+}$ or any combination thereof is added.

77. A method as described in claim 73 wherein an additional ion sensitizer selected from the group consisting of $Yb^{3+}$, $Mo^{2+}$ or any combination thereof is added.

78. A method as described in claim 74 wherein an additional ion sensitizer selected from the group consisting of $Cr^{3+}$, $Ce^{3+}$, $Nd^{3+}$ or any combination thereof is added.

79. A system for producing fluorescence comprising:
an optical fiber having a core and a cladding, the core being doped with $Pr^{3+}$; and a light source producing light at a wave length in the range of from about 0.94 to 1.07 microns to energize the $Pr^{3+}$ to the $^1G_4$ state and produce fluorescence by a $^1G_4$-$^3H_5$ transition for light at a wavelength in the range of 1.25 to 1.34 microns.

80. A method for making a system to produce fluorescence, said method comprising the steps of:
forming an optical fiber having a core and a cladding, the core being doped with $Pr^{3+}$;
connecting the optical core to a light source providing light at a wavelength in the range of from about 0.94 to 1.07 microns operable to energize the $Pr^{3+}$ to the $^1G_4$ state and produce fluorescence by a $^1G_4$-$^3H_5$ transition for light at a wavelength in the range of 1.25 to 1.34 microns.

81. A composition for the manufacture of a core for an optical fiber capable of producing an optical gain by a $^1G_4$-$^3H_5$ transition at a wavelength of 1.2 to 1.3 microns comprising:
(A) A host material selected from the group consisting of those having the composition:
$50 \leq X$ halide$_4 \leq 55$
$16 \leq BaF$ halide$_2 \leq 24$
$16 \leq Q$ halide $\leq 24$
$3 \leq LaF$ halide$_3 \leq 5$
$2 \leq Z$ halide$_3 \leq 4$,
wherein X is selected from the group consisting of Zr, Ha, Th, Bi, Pb, and any combination thereof; Q is selected from the group consisting of Na, Ag, Rb, Ce, Tl, or a combination thereof; and Z is selected from the group consisting of Al, Y, Gd, or any combination thereof; and
(B) $Pr^{3+}$.

* * * * *

REEXAMINATION CERTIFICATE (3427th)
United States Patent [19]
Ohishi et al.

[11] B1 5,309,452
[45] Certificate Issued Jan. 20, 1998

[54] PRASEODYMIUM LASER SYSTEM

[75] Inventors: Yasutake Ohishi, Mito, Japan; Elias Snitzer, Piscataway, N.J.

[73] Assignee: Rutgers University, New Brunswick, N.J.

Reexamination Request:
No. 90/004,339, Aug. 23, 1996

Reexamination Certificate for:
Patent No.: 5,309,452
Issued: May 3, 1994
Appl. No.: 830,430
Filed: Jan. 31, 1992

[51] Int. Cl.⁶ .................. H01S 3/07; H01S 3/30
[52] U.S. Cl. .................................. 372/6; 385/142
[58] Field of Search .......................... 372/6; 385/142

[56] References Cited

U.S. PATENT DOCUMENTS 4,674,835  6/1987  Mimura et al. ................ 385/142
4,815,079  3/1989  Snitzer et al. .................... 372/6

OTHER PUBLICATIONS

*CRC Handbook of Laser Science and Technology*, Supplement 1, Lasers, edited by Marvin J. Weber, Ph.d., Jan. 1991, pp. 14–19.

*British Telecom Technology Journal*, vol. 7, No. 1, Jan. 1989, pp. 58–68, S.T. Davey et al., "Rare earth doped fluorozirconate glasses for fibre devices".

Excerpts from *Fluoride Glass Optical Fibres*, P.W. France et al., CRC Press, Inc. Boca Raton, Florida, 1990, pp. 1–31, 75–99, 162–167, and 238–261 no month.

*IOOC '89—Seventh International Conference on Integrated Optics and Optical Fiber Communications*, Jul. 18–21, 1989, Kobe, Japan, B.J. Ainslie, et al., "Optical Analysis of Erbium Doped Fibres for Efficient Lasers and Amplifiers".

Excerpts from *Optical Fibre Lasers and Amplifiers*, Edited by P.W. France, CRC Press, Inc., Boca Raton, Florida, 1991, pp. 1–49 no month.

*Primary Examiner*—James W. Davie

[57] ABSTRACT

A system for producing an optical gain. The system includes an optical fiber having a core and a cladding, the core being doped with $Pr^{3+}$; and a source producing light to energize the $Pr^{3+}$ to the $^1G_4$ state and produce an optical gain by a $^1G_4$—$^3H_5$ transition at a wave-length in the range of 1.25 to 1.34 microns. The system also includes a method of making and a method of using the same.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–27 and 30–81 is confirmed.

Claims 28 and 29 are determined to be patentable as amended.

28. The [system] *composition* of claim [1] *56*, wherein the *Pr3+ is doped in the core in an amount effective to produce the optical gain when the core is energized by a source of* light produced [by the source is] at a wavelength within the range of 0.94 to 1.07 microns.

29. The [system] *composition* of claim *81*, wherein the *Pr3+ is doped in the core in an amount less than 0.1 weight percent and effective to produce the optical gain when the core is energized by a source of* light produced [by the source is] at a wavelength within the range of 0.99 to 1.02 microns.

* * * * *